United States Patent
Quinlan et al.

(10) Patent No.: US 6,705,249 B2
(45) Date of Patent: *Mar. 16, 2004

(54) PET FEEDING SYSTEM WITH STORAGE COMPARTMENT

(75) Inventors: Robert L. Quinlan, Stow, OH (US); Patrick W. Brown, Strongsville, OH (US)

(73) Assignee: Pet Zone Products Ltd., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/213,357

(22) Filed: Aug. 6, 2002

(65) Prior Publication Data

US 2003/0037732 A1 Feb. 27, 2003

Related U.S. Application Data

(63) Continuation of application No. 09/491,593, filed on Jan. 25, 2000, now Pat. No. 6,427,626.
(60) Provisional application No. 60/117,089, filed on Jan. 25, 1999.

(51) Int. Cl.[7] .................................................. A01K 5/00
(52) U.S. Cl. ...................... 119/51.01; 119/51.5; 119/61
(58) Field of Search ............................. 119/51.01, 51.5, 119/61, 72; 220/23.87, 23.89; D30/121, 129, 130, 131, 133; 30/324

(56) References Cited

U.S. PATENT DOCUMENTS

| | | | | |
|---|---|---|---|---|
| 4,065,195 A | * | 12/1977 | Fahmie | 312/258 |
| 4,085,706 A | * | 4/1978 | Evans | 119/61 |
| 4,428,325 A | * | 1/1984 | Koch | 119/61 |
| 4,532,891 A | * | 8/1985 | Jones | 119/61 |
| D294,213 S | * | 2/1988 | Chasen | D10/46.2 |
| 6,145,474 A | * | 11/2000 | Lemkin | 119/61 |
| 6,209,487 B1 | * | 4/2001 | Quinlan et al. | 119/51.01 |
| 6,427,626 B1 | * | 8/2002 | Quinlan et al. | 119/51.01 |

* cited by examiner

Primary Examiner—Charles T. Jordan
Assistant Examiner—Judith A. Nelson
(74) Attorney, Agent, or Firm—Benesch, Friedlander, Coplan & Aronoff LLP (57) ABSTRACT

A pet feeding system having a support structure for supporting a feeding vessel in an elevated position. The feeding vessel is detachable from the support structure for convenient filling with foodstuff, or for use separate from the support structure. The feeding system provides a comfortable feeding position for a dog, or other such pet. Moreover, the feeding system provides a convenient internal storage compartment for storing foodstuff prior to dispensing in the feeding vessel.

19 Claims, 6 Drawing Sheets

PET FEEDING SYSTEM WITH STORAGE COMPARTMENT

CROSS REFERENCE TO RELATED APPLICATION

This application is a continuation of U.S. application Ser. No. 09/491,593, filed Jan. 25, 2000, now U.S. Pat. No. 6,427,626, and claims the benefit of U.S. Provisional Application Serial No. 60/117,089, filed Jan. 25, 1999.

FIELD OF INVENTION

The present invention relates generally to a feeding apparatus, and more particularly to a support structure for supporting a feeding vessel in an elevated position and providing a storage compartment for foodstuff.

BACKGROUND OF THE INVENTION

It has been found that the health of a dog or other such pet, can be improved by providing a feeding position which is raised above the ground or floor. This reduces or eliminates the need for the dog to position its' head downward during feeding. Among the benefits of an elevated feeding position are that the dog swallows less air during feeding. Moreover, dogs suffering from arthritis can feed with reduced pain. Overall, an elevated feeding position provides a more comfortable and convenient feeding position.

While there are structures known in the prior art which provide an elevated position for a feeding vessel, these structures have many significant disadvantages. The disadvantages include feeding vessels which are fixed to the support structure, or feeding vessels which have curved bottom surfaces. These types of feeding vessels are inconvenient to fill with foodstuff, such as dog food or water. Moreover, such feeding vessels cannot be placed on the ground or floor for use separate from the support structure.

Many of the prior art support structures rely upon the use of ballast material to provide stability (e.g., to prevent sliding). Moreover, some prior art support structures use detachable legs, which may become unstable during prolonged use. In addition, prior art support structures do not allow for stacking, so as to reduce the amount of space needed by a retailer to store the support structures.

Another disadvantage of prior art support structures is that they do not provide a means for conveniently storing foodstuff in the feeding vessel prior to dispensing. Accordingly, additional space is required for food storage, since this foodstuff must be stored in its original packaging (e.g., a bag or box) or in a separate container.

SUMMARY OF THE INVENTION

According to the present invention there is provided a pet feeding system including a support structure and a detachable feeding vessel, wherein said support structure supports the feeding vessel at a position elevated above the ground or floor.

An advantage of the present invention is the provision of a pet feeding system wherein the feeding vessel is detachable from the support structure.

Another advantage of the present invention is the provision of a pet feeding system wherein the detached feeding vessel may be place upon a generally flat surface and used for feeding a relatively small dog (e.g., a puppy) on the ground or floor.

Another advantage of the present invention is the provision of a pet feeding system wherein the feeding vessel can be easily and conveniently grasped for removal from the support structure.

Still another advantage of the present invention is the provision of a pet feeding system wherein the feeding vessel has a raised back wall to prevent foodstuffs, such as dog food and water, from "splashing" out of the feeding vessel.

Still another advantage of the present invention is the provision of a pet feeding system, wherein the support structure allows the pet to conveniently position itself close to the feeding vessels.

Still another advantage of the present invention is the provision of a pet feeding system which eliminates the need for ballast material to provide stability.

Yet another advantage of the present invention is the provision of a pet feeding system wherein the support structure can be stacked for convenient storage.

Yet another advantage of the present invention is the provision of a pet feeding system wherein the support structure includes a storage compartment for conveniently storing foodstuff before dispensing in a feeding vessel.

Yet another advantage of the present invention is the provision of a pet feeding system wherein the foodstuff stored in a storage compartment thereof provides ballast for the feeding system.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENTS

Figure 1:
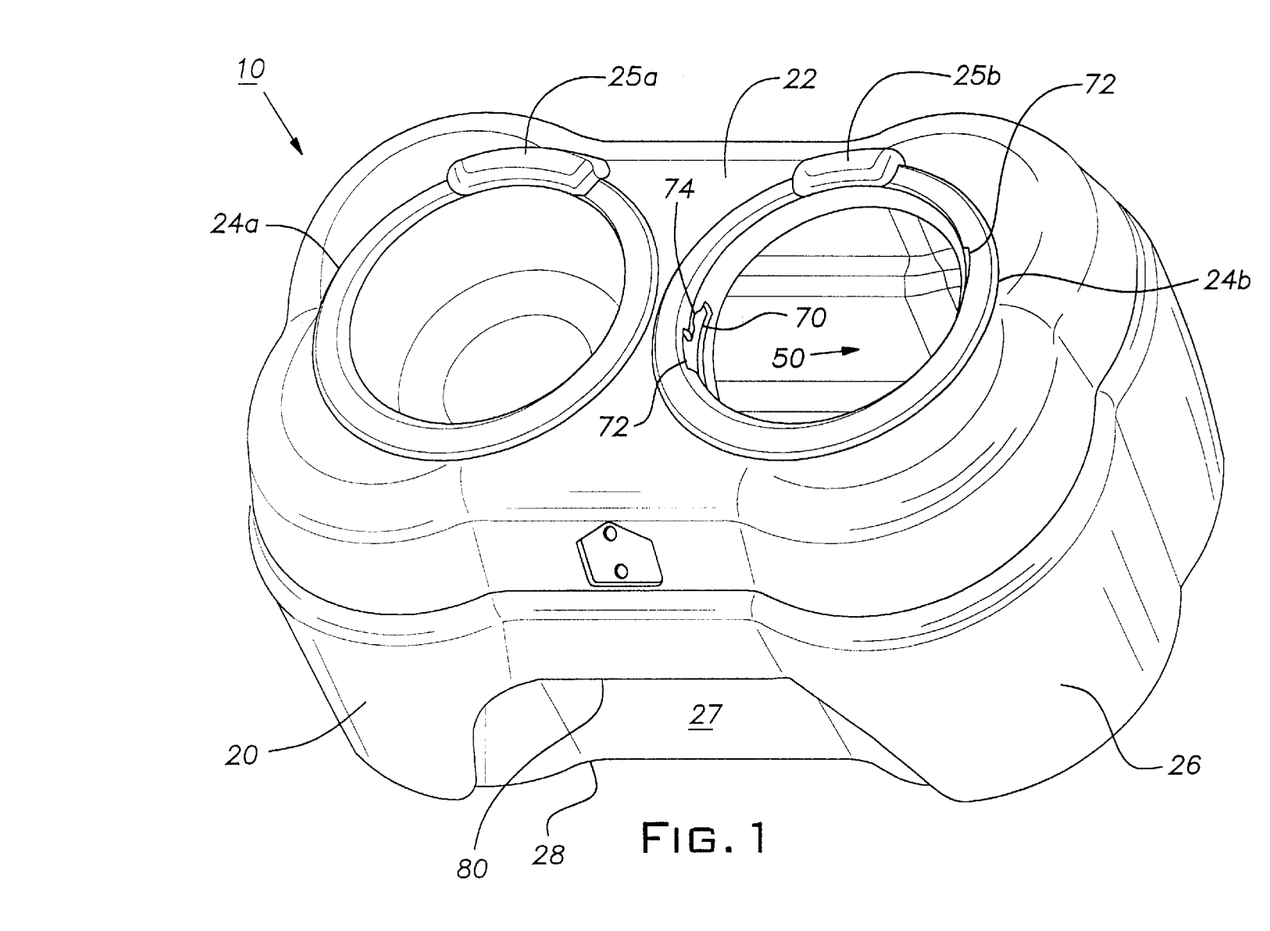
FIG. 1 is a front perspective view of the pet feeding system according to a preferred embodiment of the present invention.
Figure 2:
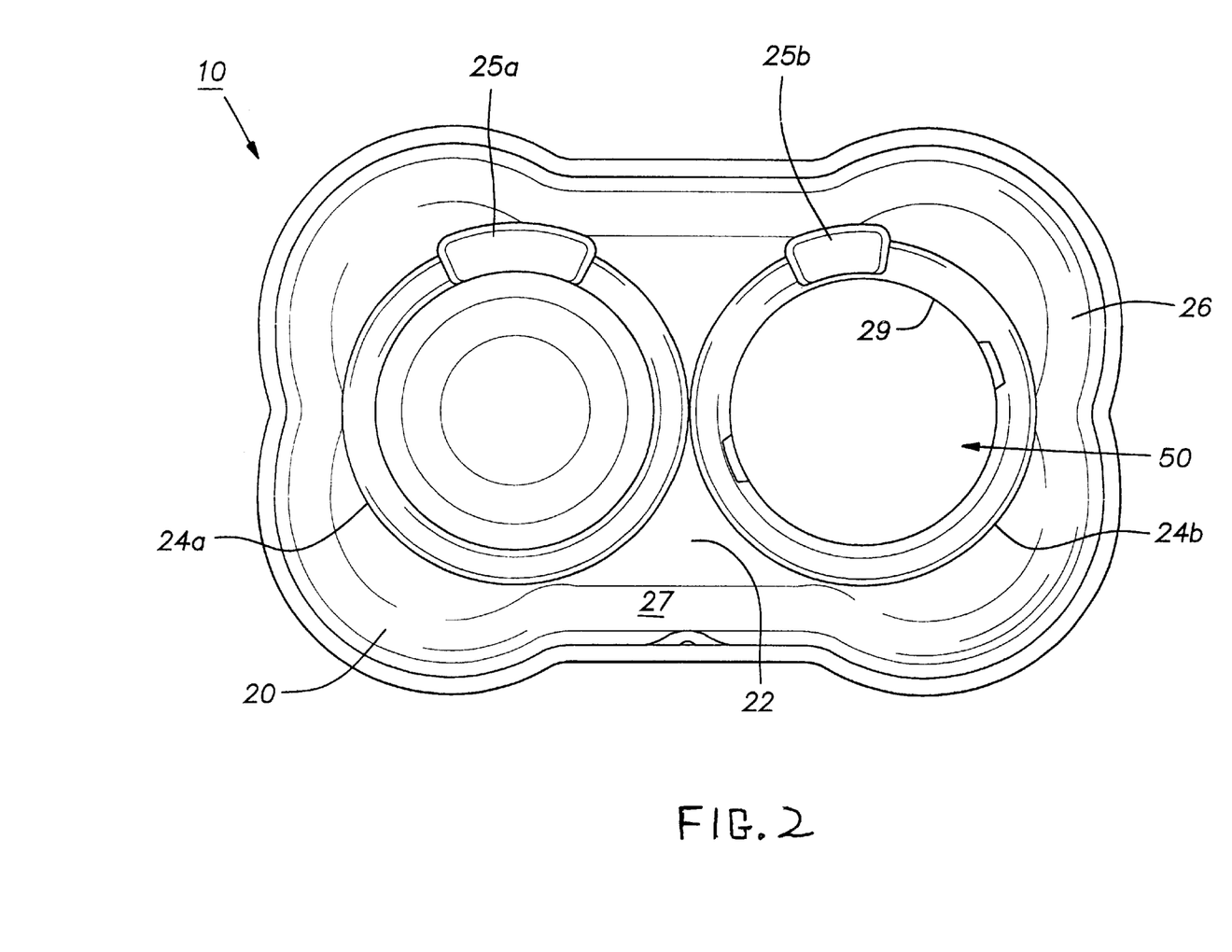
FIG. 2 is a top perspective view of the support structure of the pet feeding system.
Figure 3:
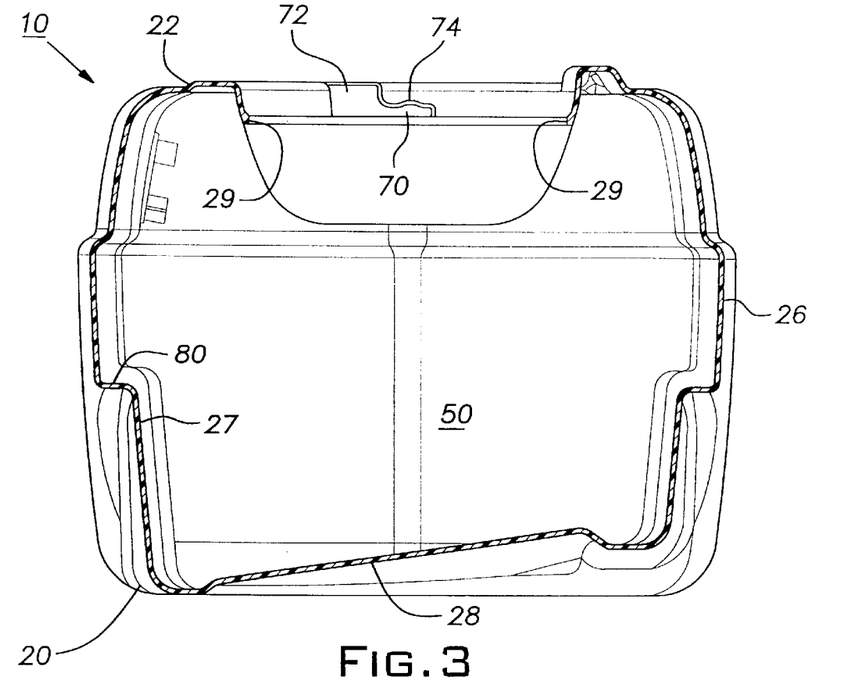
FIG. 3 is a side cross-sectional view of the pet feeding system.

Referring now to the drawings wherein the showings are for the purposes of illustrating a preferred embodiment of the invention only and not for purposes of limiting same, FIGS. 1–3 show a pet feeding system 10 according to a preferred embodiment of the present invention. Pet feeding system 10 is generally comprised of a support structure 20 and one or more feeding vessels. In a preferred embodiment, the feeding vessels include a water dish 40a and a food dish 40b.

Figure 5:
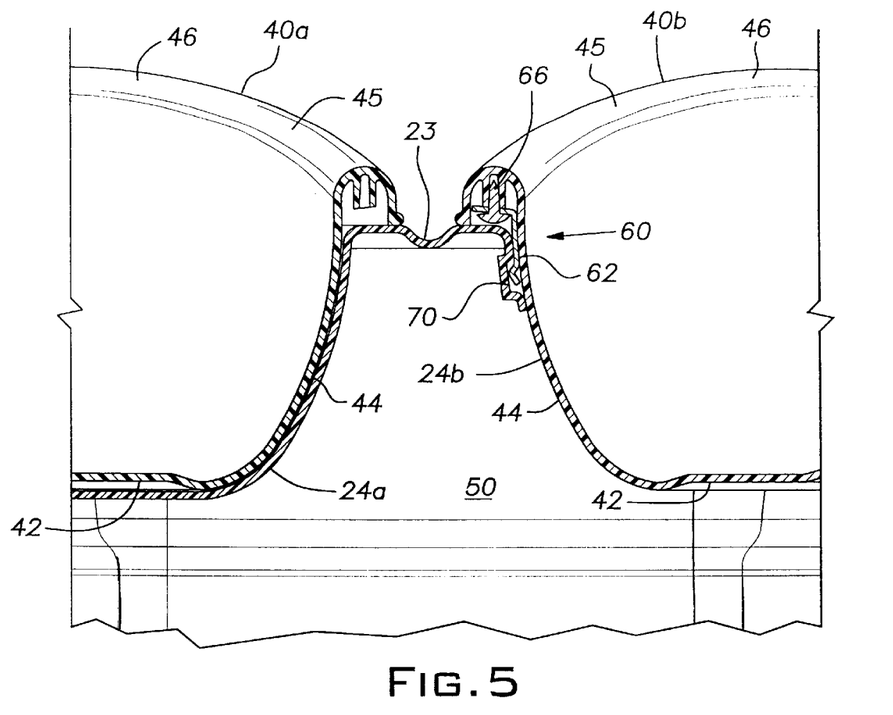
FIG. 5 is a cross-sectional view showing the engagement of the feeding vessels with the support structure of the pet feeding system.

In accordance with a preferred embodiment of the present invention, support structure 20 is a unitary "one-piece" structure, preferably constructed using a blow molding process. Support structure 20 includes a top wall 22, a downward extending side wall 26, and a bottom wall 28. Side wall 26 extends downward from top wall 22, around the perimeter thereof. It will be appreciated that side wall 26 preferably has a height in the range of 4 to 12 inches; however other dimensions are also suitable. Bottom wall 28 also connects with side wall 26, opposite top wall 22. An internal storage compartment 50 is defined by top wall 22, side walls 26 and bottom wall 28. In accordance with a preferred embodiment, storage compartment 50 has a volume sufficient to store approximately 40 lbs. of dry dog food. This stored foodstuff acts as ballast material to prevent the support structure from being easily moved by a pet. It should be appreciated that bottom wall 28 defines a bottom recess which facilitates the stacking of feeding systems, as will be described below in connection with FIGS. 7A and 7B. Moreover, bottom wall 28 may be sloped, as best seen in FIG. 3, in order to conveniently collect foodstuff in one region of internal storage compartment 50. A pair of cavities 24a and 24b are formed in top wall 22. Cavities 24a and 24b are dimensioned to respectively receive feeding vessels 40a and 40b, which are described in detail below. In a preferred embodiment, cavity 24a is a closed cavity, while cavity 24b is an open cavity. In this respect, cavity 24b has an opening which provides access to internal storage compartment 50 beneath top wall 22. It should be noted that in an alternative embodiment cavity 24a may also be configured as an open cavity. Raised portion 25a and 25b are respectively formed adjacent to cavities 24a and 24b, and act as locators and "stops" for feeding vessels 40a and 40b. A channel 23 is formed in top wall 22 between cavities 24a and 24b (FIG. 5). Channel 23 acts as a "drip guard" to prevent liquid (e.g. water) in one feeding vessel from dripping into a feeding vessel containing dry food, or from dripping into storage compartment 50. In addition, a raised portion may be formed around the circumference of cavities 24a and 24b to provide additional protection from dripping. Furthermore, a sealing surface 29 (FIG. 3) may be provided inside the upper end of cavities 24a and 24b. Sealing surface 29 provides a seal around the side of a feeding vessel.

Recesses 27 are formed at the lower end of the front and rear side walls 26 to accommodate a dog's paws or knees, as best seen in FIG. 1. This provides the dog with sufficient clearance to position itself close to the feeding vessels during feeding. Recess 27 also defines a handle surface 80 for manipulating support structure 20.

Figure 7A:
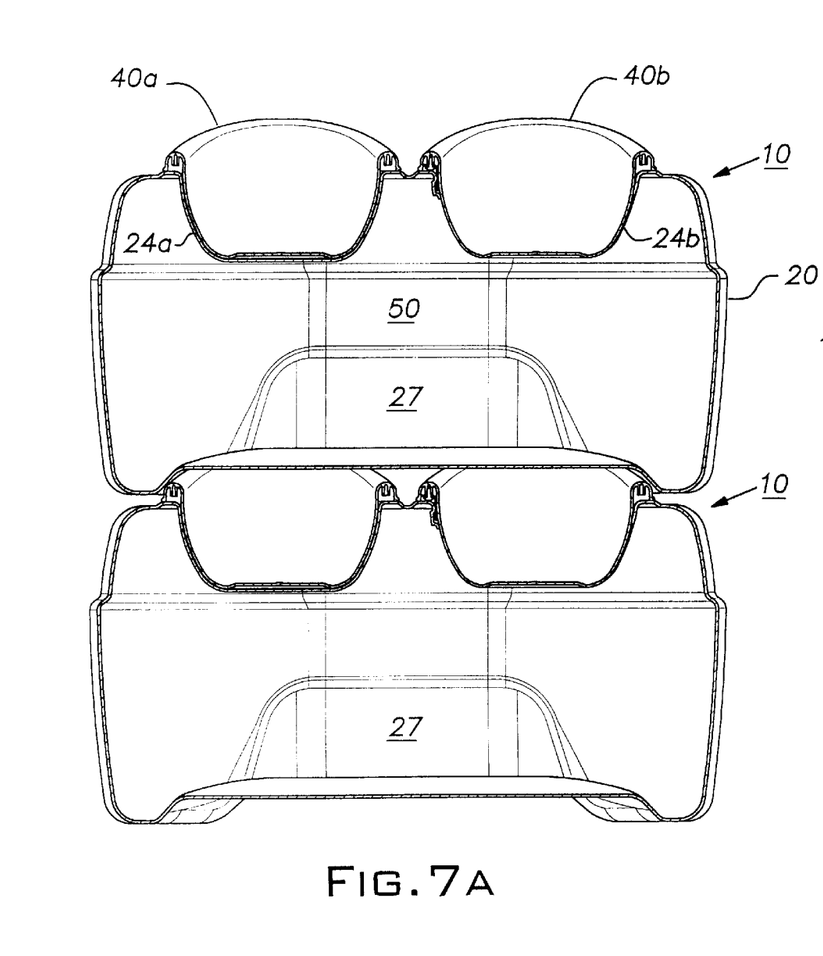
FIGS. 7A and 7B show cross-sectional views of pet feeding systems, as stacked.
Figure 7B:
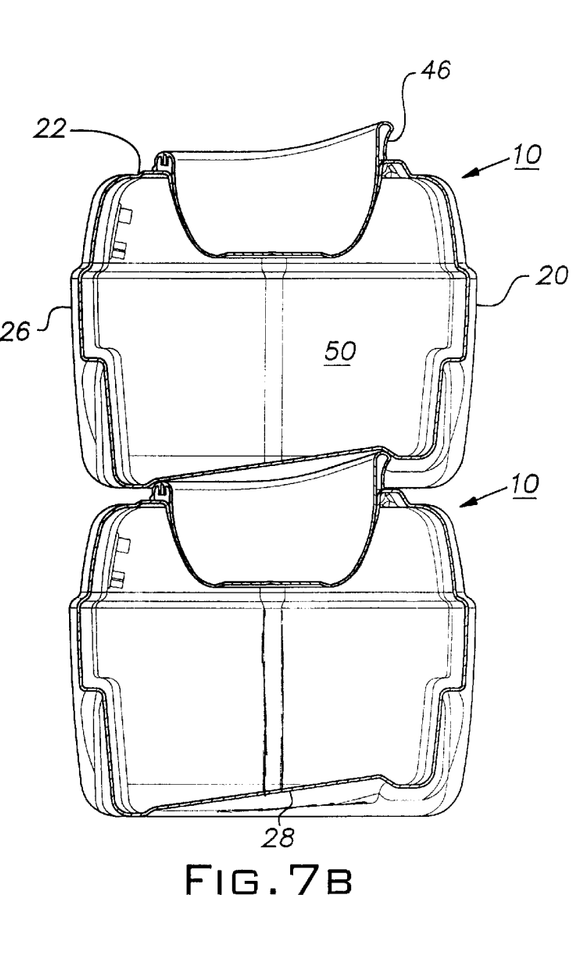

It should be appreciated that the lower surface of support structure 20 is suitably dimensioned to allow a plurality of support structures (with or without feeding vessels therein) to be stacked for convenient storage. As indicated above, a recess is formed in bottom wall 28 to accommodate stacking of feeding systems, as best seen in FIGS. 7A and 7B.

Figure 4:
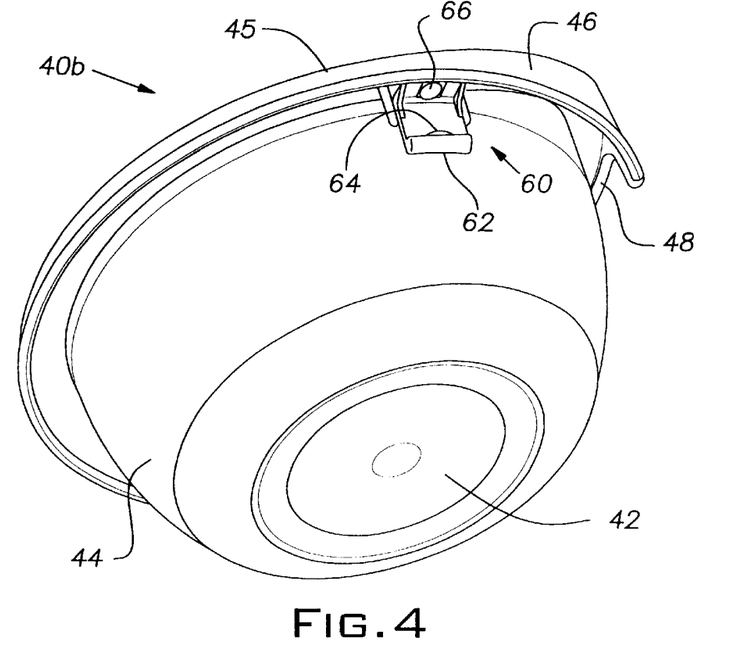
FIG. 4 is a rear perspective view of a detachable feeding vessel according to a preferred embodiment of the present invention.

Referring now to FIG. 4, feeding vessels 40a and 40b take the general form of bowls. Feeding vessel 40a is preferably used to dispense water, while feeding vessel 40b is preferably used to dispense food. Feeding vessels 40a and 40b are generally comprised of a generally planar base 42 and a circular wall 44. A lip 45 is formed along the upper edge of circular wall 44. The rear end of circular wall 44 has a raised portion 46, which acts as a "splash guard" to prevent the back splash of foodstuff, as the dog is feeding. As a result, the area surrounding the feeding system remains free of foodstuff, and less foodstuff is wasted. A notch 48 is formed in the rear of lip 45. Notch 48 forms a handle, which allows a user to easily and conveniently grasp feeding vessels 40a, 40b during detachment from support structure 20. It will be appreciated that since feeding vessels 40a, 40b have a generally planar base, they are suitable for direct placement on a generally flat surface, such as the ground or floor.

Figure 6:
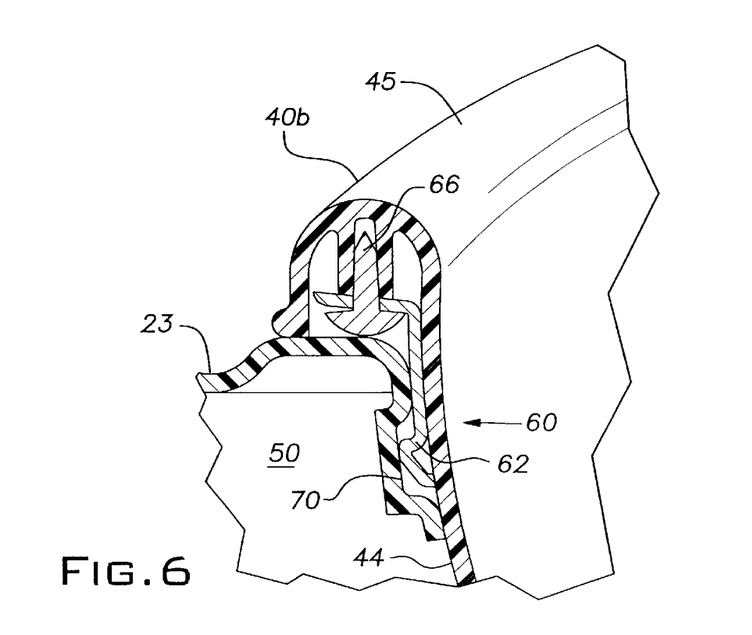
FIG. 6 is a partial enlarged view of FIG. 5 showing the engagement of one of the feeding vessels with the support structure of the pet feeding system.

Referring now to FIGS. 4–6, feeding vessels 40a, 40b may also include one or more retaining means 60 for securing feeding vessels 40a, 40b to support structure 20. Retaining means 60 includes a retainer clip 62 and a ball detent or raised portion 64. In a preferred embodiment a screw 66 attaches retainer clip 62 to the feeding vessel; however other means for attachment or integration of the retainer clip are also suitable. Retainer clip 62 is dimensioned to be received within slots formed adjacent to the cavity for receiving a feeding vessel. In particular, feeding vessel 40b is properly seated in cavity 24b by first locating the retainer clips 62 in respective locator slots 72. This is carried out by moving retainer clips 62 downward into locator slots 72. Feeding vessel 40b is then rotated to properly engage retainer clips 62 in retainer slot 70. A detent 74 in retainer slot 70 receives raised portion 64 to provide a positive locking engagement. To remove feeding vessel 40b from cavity 24b, feeding vessel 40b is rotated to disengage retainer clips 62 from retainer slots 70. Then feeding vessel is lifted upward to remove retainer clips 62 from locator slots 72. Accordingly, it should be appreciated that dual motions are needed to separated the feeding vessel from the cavity. This significantly impedes a pet (e.g., dog) from separating the feeding vessel from the cavity and gaining access to the storage compartment.

It should be appreciated that while only feeding vessel 40b and cavity 24b have been shown as having retaining means 60 and corresponding slots, feeding vessel 40a and cavity 40a may be likewise configured.

Figure 8:
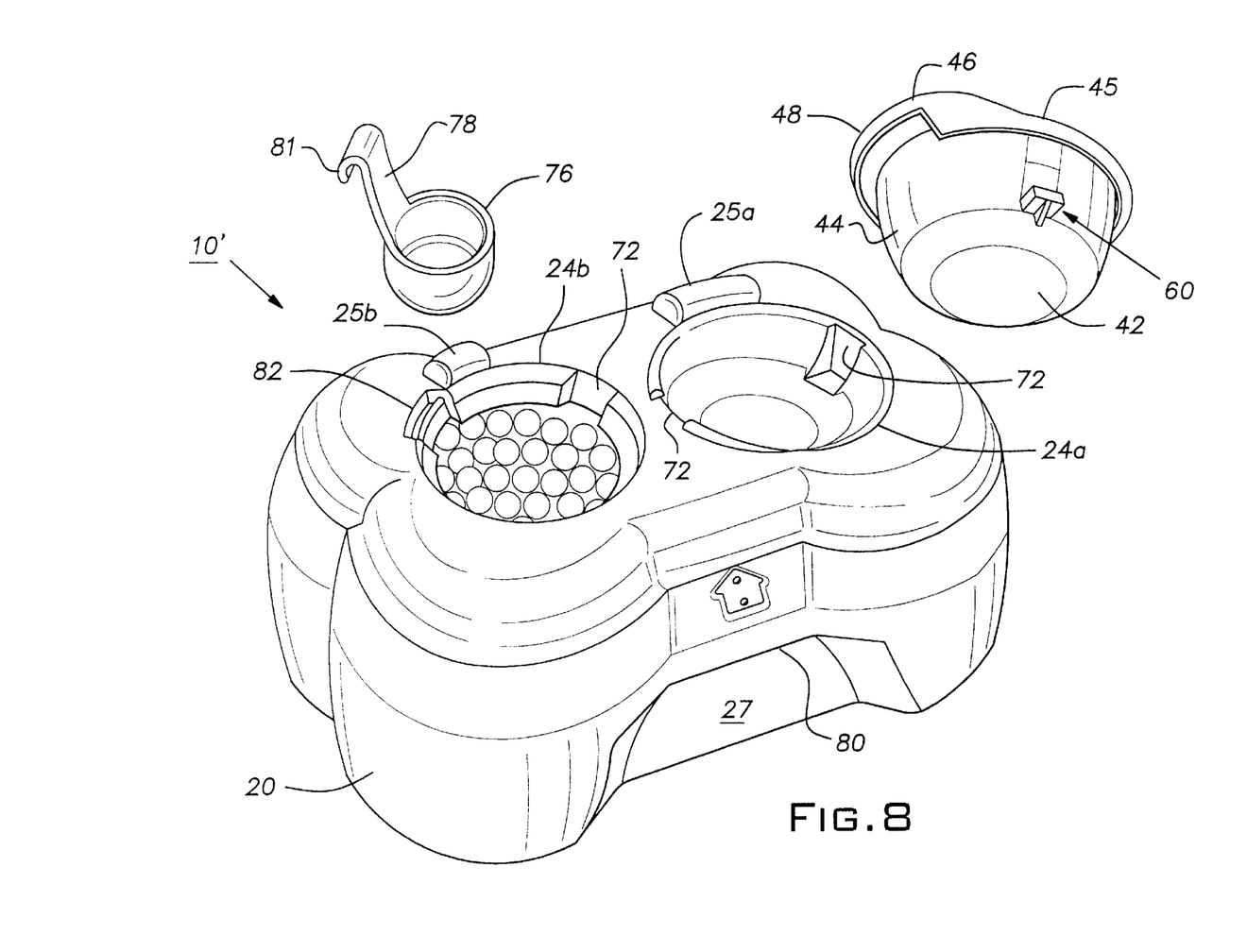
FIG. 8 shows a front perspective view of the pet feeding system according to an alternative embodiment of the present invention.

FIG. 8 illustrates an alternative embodiment of the present invention. In this regard a feeding system 10' is shown having a similar configuration as feeding system 10. One notable difference is that the position of the open and closed cavities have been reversed. Moreover, an attachable scoop 76 is provided. The handle 78 of the attachable scoop 76 includes a hook portion 81 which engages with a ledge 82 formed adjacent to the open cavity 24b. Accordingly, the scoop 76 is conveniently stored beneath one of the feeding vessels 40a, 40b and the feeding vessel 40b is mountable within the open cavity 24b.

The invention has been described with reference to a preferred embodiment. Obviously, modifications and alterations will occur to others upon a reading and understanding of this specification. While the present invention has been illustrated with two feeding vessels, it should be appreciated that the feeding system of the present invention may be suitably configured with one or more feeding vessels. Moreover, while the support structure of the present invention has been illustrated as having the general shape of a dog bone, the support structure can take other suitable forms. In addition, it should be appreciated that the present invention may be adapted for use by animals other than dogs. In this respect, the height and size of the pet feeding system may be adapted for both smaller and larger animals. Furthermore, it should be understood that while the feeding vessels have been illustrated as being detachable, they may be integrated with the support structure in an alternative embodiment of the present invention. It is intended that all such modifications and alterations be included insofar as they come within the scope of the appended claims or the equivalents thereof.

We claim:

1. A pet feeding system with storage compartment comprising:
   at least one feeding vessel including a cavity for holding foodstuff and an outwardly extending lip formed along the upper edge of said cavity;
   a storage container for conveniently storing foodstuff before dispensing into a feeding vessel, said storage container comprising:
   a bottom wall;
   side walls extending upwardly from said bottom wall;
   a top wall connecting said side walls opposite said bottom wall, said top wall having at least one opening to permit access the interior of said storage container, said at least one feeding vessel removably mountable within said at least one opening and supported within said storage container by engagement of said lip and said top wall.

2. The pet feeding system of claim 1 wherein said bottom wall is sloped so as to urge foodstuff stored therein to gather in a particular region of said storage container.

3. The pet feeding system of claim 1 wherein said side walls include mutually opposed front and rear walls, at least one recess formed in each of said front and rear walls to define handle surfaces for manipulating said pet feeding system.

4. The pet feeding system of claim 3 wherein said recesses are formed at the lower end of each said front and rear wall to accommodate a pet's legs to allows the pet to position itself close to the feeding vessel during feeding.

5. The pet feeding system of claim 1 further comprising orienting means for orienting said at least one feeding vessel in a single orientation with respect to said storage container.

6. The pet feeding system of claim 5 wherein said orienting means comprises:
   at least one raised portion extending upwardly from said top wall; and
   at least one notch formed in said outwardly extending lip of said feeding vessel capable of engaging said at least one raised portion to orient said at least one feeding vessel in a single orientation with respect to said storage container.

7. The pet feeding system of claim 1 further comprising retaining means for securing
   said at least one feeding vessel to said top.

8. The pet feeding system of claim 7 wherein said retaining means includes a wall extending downwardly from said top wall, said downwardly extending wall including a sealing surface to engage said feeding vessel.

9. The pet feeding system of claim 8 wherein said sealing surface extends 360 degrees around the perimeter of said opening.

10. The pet feeding system of claim 8 wherein said retaining means further includes:
    at least one retainer slot formed on the surface facing said opening of said downwardly extending wall; and
    at least one retainer clip extending downwardly from said lip which engages said retainer slot when said feeding vessel is inserted into said opening to retain said feeding vessel within said opening.

11. The pet feeding system of claim 10 wherein said downwardly extending wall includes a pair of mutually confronting retainer slots and said lip of said feeding vessel includes a pair of mutually opposed retainer clips.

12. A pet feeding system with storage compartment comprising:
    at least one feeding vessel having a cavity for holding foodstuff;
    a lip formed along the upper edge of said cavity, said lip including an outwardly extended portion and a downwardly extended portion;
    a storage container comprising:
    a bottom wall;
    side walls extending upwardly from said bottom wall;
    a top wall connecting said side walls opposite said bottom wall, said top wall having at least one opening to permit access the interior of said storage container, said feeding vessel removably mountable within said opening, said feeding vessel supported within said storage container by engagement of said downwardly extending portion of said lip against said top wall, thereby enabling the portion of said lip and said cavity extending above said top wall to act as a handle in inserting and removing said feeding vessel from said opening.

13. The pet feeding system of claim 12 wherein said at least one feeding vessel further includes a notch formed in said downwardly extending portion of said lip to promote ease in grasping said lip.

14. The pet feeding system of claim 12 wherein said lip includes a raised rear portion which acts as a splash guard to prevent foodstuffs from splashing out of said feeding vessel.

15. The pet feeding system of claim 13 further comprising:
    at least one raised portion extending upwardly from said top wall, said at least one raised portion capable of engaging said notch so as to locate said feeding vessel in a single orientation with respect to said storage container.

16. A pet feeding system with storage compartment comprising:
    first and second feeding vessels, each feeding vessel comprising:
    a horizontal base whereby said feeding vessels, when removed from said pet feeding system, may be placed upon a generally flat surface and used as a conventional pet feeding dish;
    a cavity for holding foodstuff;
    an outwardly extending lip formed along the upper edge of said cavity;
    a storage container for conveniently storing foodstuff before dispensing into a feeding vessel, said storage container comprising:
    a bottom wall;
    side walls extending upwardly from said bottom wall;
    a top wall connecting said side walls opposite said bottom wall, said top wall having an opening to permit access to the interior of said storage container, said first feeding vessel removably mountable within said opening, said first feeding vessel supported within said storage container by engagement of said lip and said top wall; and
    a depression formed on the surface of said top wall, said depression capable of receiving said second feeding vessel.

17. The pet feeding system of claim 16 further comprising:
    a scoop capable of being inserted through said opening to remove foodstuff stored with said storage container, said scoop comprising:

a concave vessel for holding a portion of foodstuff;

a handle connected at one end to said concave vessel and forming a hook portion at the other end;

a ledge formed in said top wall wherein said hook portion engages said ledge to support said scoop within said storage container when said scoop is not in use.

18. The pet feeding system of claim 17 wherein said first feeding vessel may be inserted into said opening and removably mounted to said top wall while said scoop is supported and stored within said storage container.

19. A pet feeding system with storage compartment capable of nested stacking with like pet feeding systems with storage compartments, said pet feeding system with storage compartment comprising:

a storage container comprising:

a bottom wall;

side walls extending upwardly from said bottom wall;

a top wall connecting said side walls opposite said bottom wall, said top wall having at least one opening to permit access to the interior of said storage container;

at least one feeding vessel removably mounted within said opening and supported by said top wall;

the exterior of said bottom wall having a recessed portion configured sufficiently to nest atop the removably mounted feeding vessel of a subjacent pet feeding system with storage compartment of identical construction, to allow said pet feeding systems with storage compartments to be stacked in nested relationship.

* * * * *